No. 792,671. PATENTED JUNE 20, 1905.
H. & J. R. SHEARER.
NECK YOKE CENTER.
APPLICATION FILED DEC. 13, 1904.
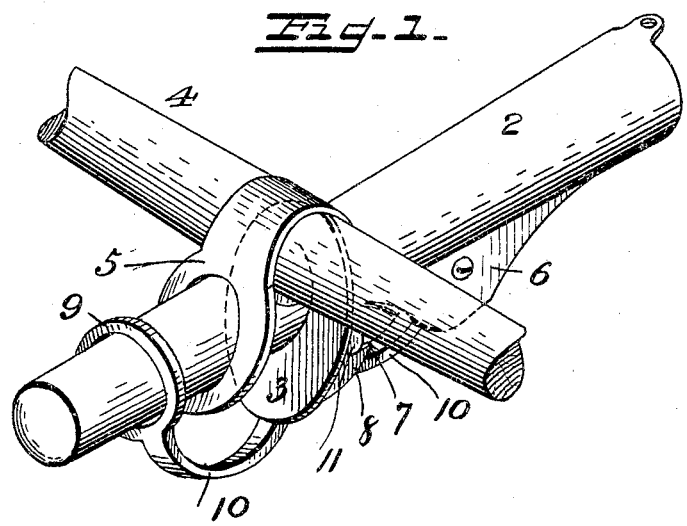
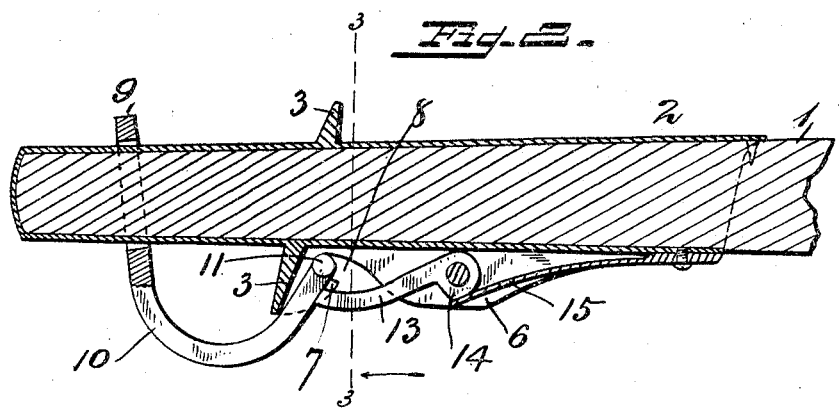
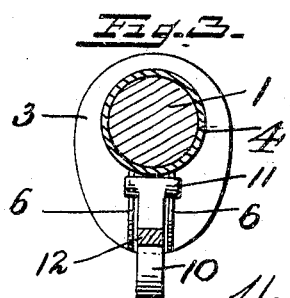

No. 792,671. Patented June 20, 1905.

UNITED STATES PATENT OFFICE.

HUGH SHEARER AND JAMES R. SHEARER, OF DILLON, MONTANA.

NECK-YOKE CENTER.

SPECIFICATION forming part of Letters Patent No. 792,671, dated June 20, 1905.

Application filed December 13, 1904. Serial No. 236,761.

*To all whom it may concern:*

Be it known that we, HUGH SHEARER and JAMES R. SHEARER, citizens of the United States, residing at Dillon, in the county of Beaverhead and State of Montana, have invented new and useful Improvements in Neck-Yoke Centers, of which the following is a specification.

Our invention is a neck-yoke center; and it consists of a thimble adapted to be secured on the front end of the forward pole of a vehicle, with sightly and easily-operated mechanism to hold the neck-yoke in place.

The object of our invention is to furnish a sightly, neat, strong, cheap, and easily-operated attachment to the front end of the forward pole of vehicles to hold the neck-yoke properly in place.

In the accompanying drawings, Figure 1 is a perspective view of our invention with a section of a neck-yoke in position. Fig. 2 is a longitudinal vertical view, partly in section and partly in elevation. Fig. 3 is a rear end view of our invention, the rear end being cut away at the point indicated by the dotted line 3 3, Fig. 2.

Our invention is described as follows:

In the drawings, 1 represents the front end of the pole on which is fitted and secured our invention. 2 represents the thimble secured on the front end of said pole.

3 represents a stop which prevents the collar which carries the yoke from slipping back too far on the thimble.

4 represents a section of a yoke in place, and 5 represents the yoke-collar.

We do not claim the yoke-collar nor the yoke as our invention. Consequently the style of yoke and collar represented in the drawings or any other appropriate yoke and collar may be used.

Secured to and extending from the lower face of the thimble 2 are two flanges 6, set longitudinally and leaving between them a channel. These flanges extend downwardly at their front ends and are joined to the rear face of the stop 3. They are cut upwardly near their front ends nearly to the thimble, then downwardly for a short distance, and then rearwardly, thus forming their front ends into bills 7, leaving depressions or sockets 8, for a purpose hereinafter described.

Fitting loosely on the front end of the thimble and adapted to be turned thereon or removed therefrom is a ring 9, and extending from the lower part of said ring 9 is a bow-shaped arm 10, its rear end adapted to fit over the rear side of the stop 3. On the extreme free end of said arm is a cross-bar 11, adapted to fit over the bills 7 and in the sockets 8. Said arm has in its lower face and just below the cross-bar 11 a recess 12. To the rear of said cross-bar 11 and between the flanges 6 is hinged a dog 13. This dog 13 has at its pivot end an enlargement 14, and running from said enlargement is a spring 15, the rear of which is secured to the thimble at its rear end. This spring is so constructed in relation to the enlargement 14, that when the free end of said dog is up in place it is firmly held in the depression 12 of the arm 10 and when it is pulled back it is held back by said spring, and when thus held back the ring 9 and arm 10 may be pushed rearwardly until the cross-bar 11 is released from over the bills 7, and the ring, arm, and cross-bar may be removed from the front end of the thimble and the collar 5 and the neck-yoke put in place, and then said ring, arm, and cross-bar return to their former positions.

Having described our invention, what we claim as new, and desire to secure by Letters Patent, is—

1. A thimble 2, adapted to fit on the front end of the forward pole of a vehicle; a stop 3, secured around said thimble, not far from its front end; flanges 6, extending longitudinally and downwardly from said thimble, leaving between them a channel, said flanges having in their front ends, sockets 8; collar 9, fitting loosely over the front end of said thimble; bowed arm 10, secured to the lower part of said ring, its front end reaching rearwardly and behind the stop 3; cross-bar 11, secured to the free end of said bowed arm, and adapted to fit in the sockets 8; dog 13, hinged between said flanges, its front end adapted to press against the rear end of bowed arm 10, and keep said cross-bar 11, locked in said sockets; spring 15, secured to said thimble, and adapted to hold said dog in contact with said bowed arm, or out of contact with the same, substantially as shown and described and for the purposes set forth.

2. A thimble adapted to fit on the front end of the forward pole of a vehicle; a stop fitting around said thimble, near its front end; flanges extending downwardly and longitudinally from said thimble, leaving between them a channel; a ring fitting loosely around the front end of said thimble, having extending from it a bowed arm, its free end adapted to reach behind said stop, and between said flanges; a dog, hinged between said flanges, and adapted to hold the free end of said arm in place, and a spring adapted to hold said dog in or out of contact with said bowed arm, substantially as shown and described and for the purposes set forth.

In testimony whereof we affix our signatures in presence of two subscribing witnesses.

HUGH SHEARER.
JAMES R. SHEARER.

Witnesses:
CHAS. HIRSCHMAN,
DANIEL GRANT.